(12) United States Patent
Jin et al.

(10) Patent No.: US 7,062,485 B1
(45) Date of Patent: *Jun. 13, 2006

(54) METHOD AND APPARATUS FOR SCORE NORMALIZATION FOR INFORMATION RETRIEVAL APPLICATIONS

(76) Inventors: Huaichuan Hubert Jin, 212 Jacob's Creek Dr., Hershey, PA (US) 17033; Richard Schwartz, 1691 Yale Pl., Rockville, MD (US) 20850; Frederick G. Walls, 22700 Lake Forest Dr., Apt. 337, Lake Forest, CA (US) 92630; Sreenivasa P. Sista, 14 Byron Rd., Apt. 4, Chestnut Hill, MA (US) 02467

(*) Notice: Subject to any disclaimer, the term of this patent is extended or adjusted under 35 U.S.C. 154(b) by 176 days.

This patent is subject to a terminal disclaimer.

(21) Appl. No.: 10/665,056

(22) Filed: Sep. 18, 2003

Related U.S. Application Data

(63) Continuation of application No. 09/654,365, filed on Sep. 1, 2000, now Pat. No. 6,651,057.

(51) Int. Cl.
*G06F 17/30* (2006.01)
(52) U.S. Cl. ............................................. 707/3; 707/5
(58) Field of Classification Search .................... 707/3, 707/5, 6, 7, 10, 102, 104.1; 600/301; 704/224, 704/272; 715/531
See application file for complete search history.

(56) References Cited

U.S. PATENT DOCUMENTS 6,289,353 B1 * 9/2001 Hazlehurst et al. ......... 707/102
6,345,252 B1 * 2/2002 Beigi et al. .................. 704/272

OTHER PUBLICATIONS

J. Allan, et al., Topic Detection and Tracking Pilot Study Final Report, Proc. Of the DARPA Broadcast News Transcription and Understanding Workshop, Feb. 1998.

Yiming Yang, Expert Network: Effective and Efficient Learning from Human Decisions in Text Categorization and Retrieval, Aug. 1994, Proceedings of the 17th Annual Intl. ACM SIGIR Conference on Research and Development in Information Retrieval.

* cited by examiner

*Primary Examiner*—Apu M Mofiz
(74) *Attorney, Agent, or Firm*—Fish & Neave IP Group Ropes & Gray LLP

(57) ABSTRACT

A method and apparatus for normalizing a score associated with a document is presented. Statistics relating to scores assigned to a set of training documents not relevant to a topic are determined. Scores represent a measure of relevance to the topic. After the various statistics have been collected, a score assigned to a testing document is normalized based on those statistics. The normalized score is then compared to a threshold score. Subsequently, the testing document is designated as relevant or not relevant to the topic based on the comparison.

29 Claims, 6 Drawing Sheets

US 7,062,485 B1

METHOD AND APPARATUS FOR SCORE NORMALIZATION FOR INFORMATION RETRIEVAL APPLICATIONS

RELATED APPLICATION

The instant application is a continuation under 37 CFR 1.53(b) of U.S. application Ser. No. 09/654,365, filed Sep. 1, 2000, now U.S. Pat. No. 6,651,057 which is hereby incorporated herein by reference in its entirety. The benefit of an earlier filing date under 35 U.S.C. § 120 is claimed.

FIELD OF THE INVENTION

The present invention relates to the field of information retrieval. More particularly, the invention relates to an apparatus and method for score normalization for information retrieval applications.

BACKGROUND OF THE INVENTION

Information retrieval (IR) systems have been developed that allow users to identify particular documents of interest from among a larger number of documents. IR systems are useful for finding an article in a digital library, a news document in a broadcast repository, or a particular web site on the worldwide web. To use such systems, the user specifies a query containing several words or phrases specifying areas of interest, and the system then retrieves documents it determines may satisfy the query.

An IR system typically ranks documents with some measure (e.g., score) by the likelihood of relevance to a query. The ranking order is useful in determining whether one document is more relevant than another. Most applications, however, have the selection of relevant documents as their final goals. A ranking order by itself does not provide an indication of whether a document is actually relevant to the query. A large number of documents that are low on the ranking order invariably are provided as a result of the query, despite the fact that these documents probably are not very relevant.

In order to make a decision on the selection of documents that are relevant to the query, a threshold on the scores may be utilized. Scores above the threshold are designated as relevant, and scores below the threshold are designated as not relevant. Previous systems generally use an ad-hoc approach to picking the threshold, such as looking at the top few documents in the ranking order and then setting an arbitrary score to be the threshold.

This method of choosing thresholds, however, makes it difficult to come up with a consistent decision threshold across queries, because the scores assigned documents for one query do not generally relate to the scores assigned documents for a different query. This results in a degradation of system performance for the task. The alternative is to set the threshold for each query, but this is impracticable. Accordingly, there is presently a need for a system that normalizes scores so that a decision threshold is consistent across different queries.

SUMMARY OF THE INVENTION

A method consistent with the present invention normalizes a score associated with a document. Statistics relating to scores assigned to a set of training documents not relevant to a topic are determined. Scores represent a measure of relevance to the topic. After the various statistics have been collected, a score assigned to a testing document is normalized based on those statistics. The normalized score is then compared to a threshold score. Subsequently, the testing document is designated as relevant or not relevant to the topic based on the comparison.

Another method consistent with the present invention normalizes a score associated with a document. A query that includes a topic is received. Next, statistics relating to scores assigned to a set of training documents not relevant to a topic are determined. Scores represent a measure of relevance to the topic. After the various statistics have been collected, a score assigned to a testing document is normalized based on those statistics.

Another method consistent with the present invention searches for documents relevant to a topic. A query including a topic is sent to a processor. The processor determines statistics relating to scores assigned to a set of training documents not relevant to a topic, normalizes a score assigned to a testing document based on the statistics, and designates the testing document as relevant or not relevant to the topic based on the normalized score. Results are then received from the processor indicating a document relevant to the topic.

An apparatus consistent with the present invention normalizes a score associated with a document. The apparatus includes a memory having program instructions and a processor responsive to the program instructions. The processor determines statistics relating to scores assigned to a set of training documents not relevant to a topic, the scores representing a measure of relevance to the topic; normalizes a score assigned to a testing document based on the statistics; compares the normalized score to a threshold score; and designates the testing document as relevant or not relevant to the topic based on the comparison.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

An apparatus and method consistent with the present invention normalizes scores in information retrieval applications. The score normalization is based on a statistical hypothesis test based procedure. A particular topic may be acquired in the form of a query from a user. Statistics from both off-topic stories and on-topic stories are collected. These statistics include the mean of the scores assigned to a set of off-topic training stories, the mean of the scores assigned to a set of on-topic training stories, the standard deviation of the scores assigned to a set of off-topic training stories, and the standard deviation of the scores assigned to a set of on-topic training stories. A score is a measure of the relevance of a particular story to a topic. Using the statistics, the score assigned to a testing story is normalized. The formula used for normalization is based on the statistics based on off-topic training stories. The newly generated normalized score is compared to a threshold score. For example, suppose that the threshold score has been set to 6.5, and the normalized score for a given story and topic is 7.0. The normalized score and threshold score are compared to each other to determine whether the story is on-topic or off-topic. When the normalized score is above the threshold, the testing story is considered on-topic. When the normalized score is below the threshold, the testing story is considered off-topic. Normalizing scores in this manner makes it possible to use the same threshold across many topics and makes it possible for applications to handle multiple queries by taking the intersection of selected relevant documents.

Computer Environment

Figure 1:
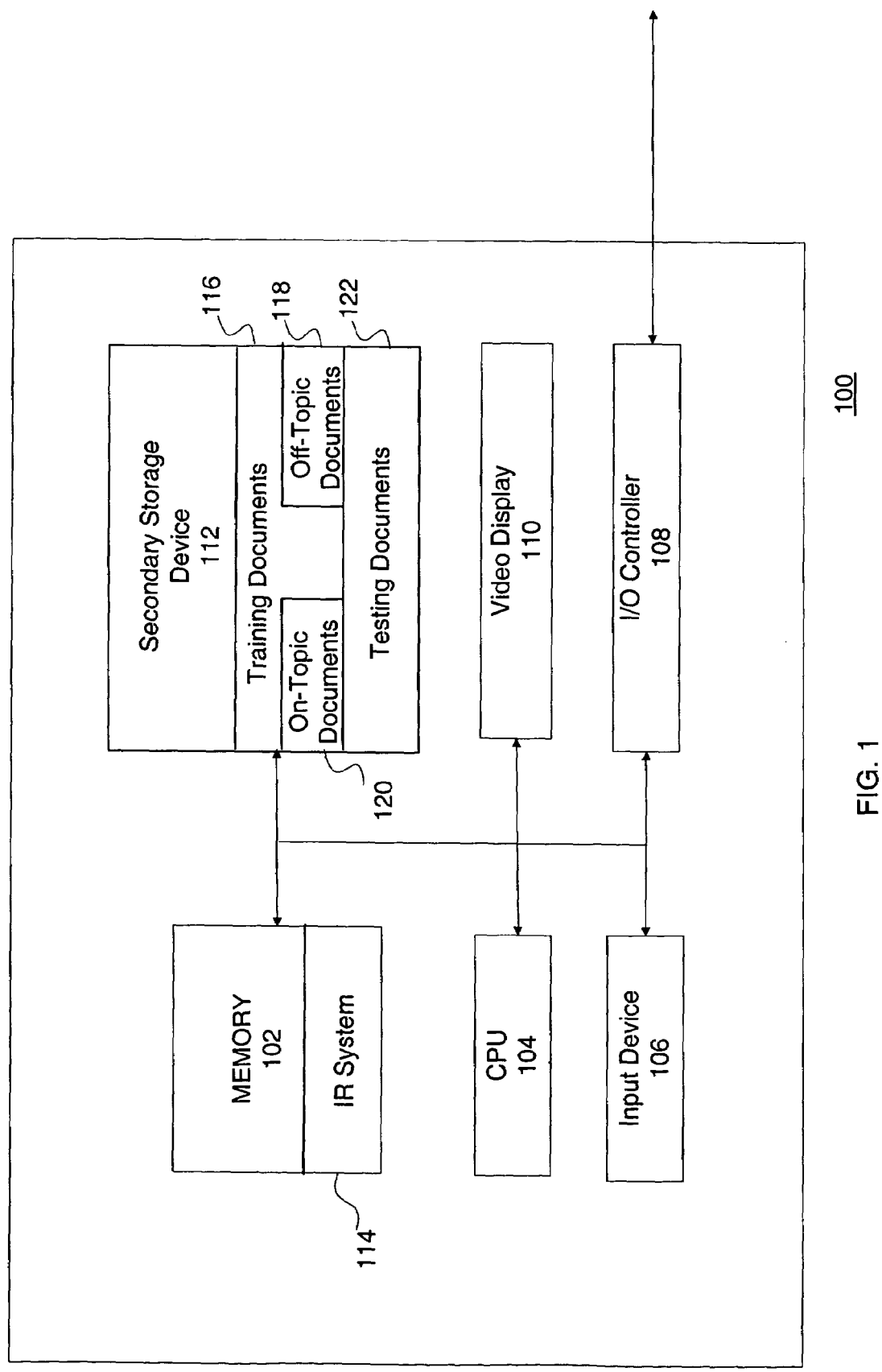
FIG. 1 is a diagram of an exemplary computer environment in which the features and aspects of the present invention may be implemented.

FIG. 1 is a diagram of a partially expanded view of an exemplary computer environment 100 in which the features and aspects of the present invention may be implemented. Computer environment 100 includes memory 102, central processing unit (CPU) 104, input device 106, I/O controller 108, video display 110, and secondary storage device 112. Memory 102 contains IR system 114. Secondary storage device 112 contains training documents 116 and testing documents 122. Documents may include articles (e.g., stories) from a newswire, radio/television audio broadcast (speech recognition engine needed), articles from a digital library, web sites on the world wide web, or any other files or data that are identifiable by their association with one or more topics. A topic is one or more words or phrases specifying an area of interest. For example, with respect to a news story, a topic could be defined as a particular event, such as specific bombings, elections, crimes, trials, etc. A user may specify a topic through a query to IR system 114. The user may be operating a remote computer (not shown) and may send the query to computer environment 100 via I/O controller 108. The remote computer may be connected to computer environment 100 via the Internet, modem dialup, on-line service, ISDN, wireless communication, or other data transmission scheme. Alternatively, the user may be operating computer environment 100 locally, using, for example, input device 106.

Training documents 116 include on-topic documents 120 that are a number of documents that reflect a particular topic and off-topic documents 118 that are a number of documents that do not reflect the particular topic. Training documents 116 are classified as either on-topic documents 120 or off-topic documents 118 by human annotators. Typically, a relatively small number of documents are included in on-topic documents 120 for a particular topic, while a large number of documents are included in off-topic documents 118 for that topic. Testing documents 122 are a number of documents that have not yet been labeled as on-topic or off-topic. IR system 114 uses on-topic documents 120 and off-topic documents 118 for training purposes, the result of which is a model for a particular topic. IR system 114 implements methods consistent with the present invention to normalize scores representing the closeness of a testing document 122 to a particular topic so that a decision can be made as to whether or not the testing document 122 is on-topic.

Secondary storage device 112 may be implemented using a disk drive, CD-ROM drive, or other suitable device. In one embodiment, IR system 114 can be loaded into memory 102 or CPU 104 from a removable computer-readable medium using secondary storage device 112. Input device 106 may be, for example, a keyboard and/or a point-and-click device, such as a mouse, light pen, touch screen or touch pad. I/O controller 108 may be a bus controller, network communications adapter, or similar device for controlling communications to and from computer 102. Memory 102 may be implemented using volatile memory (e.g., RAM) and/or non-volatile memory (e.g., ROM).

Information Retrieval System

Figure 2:
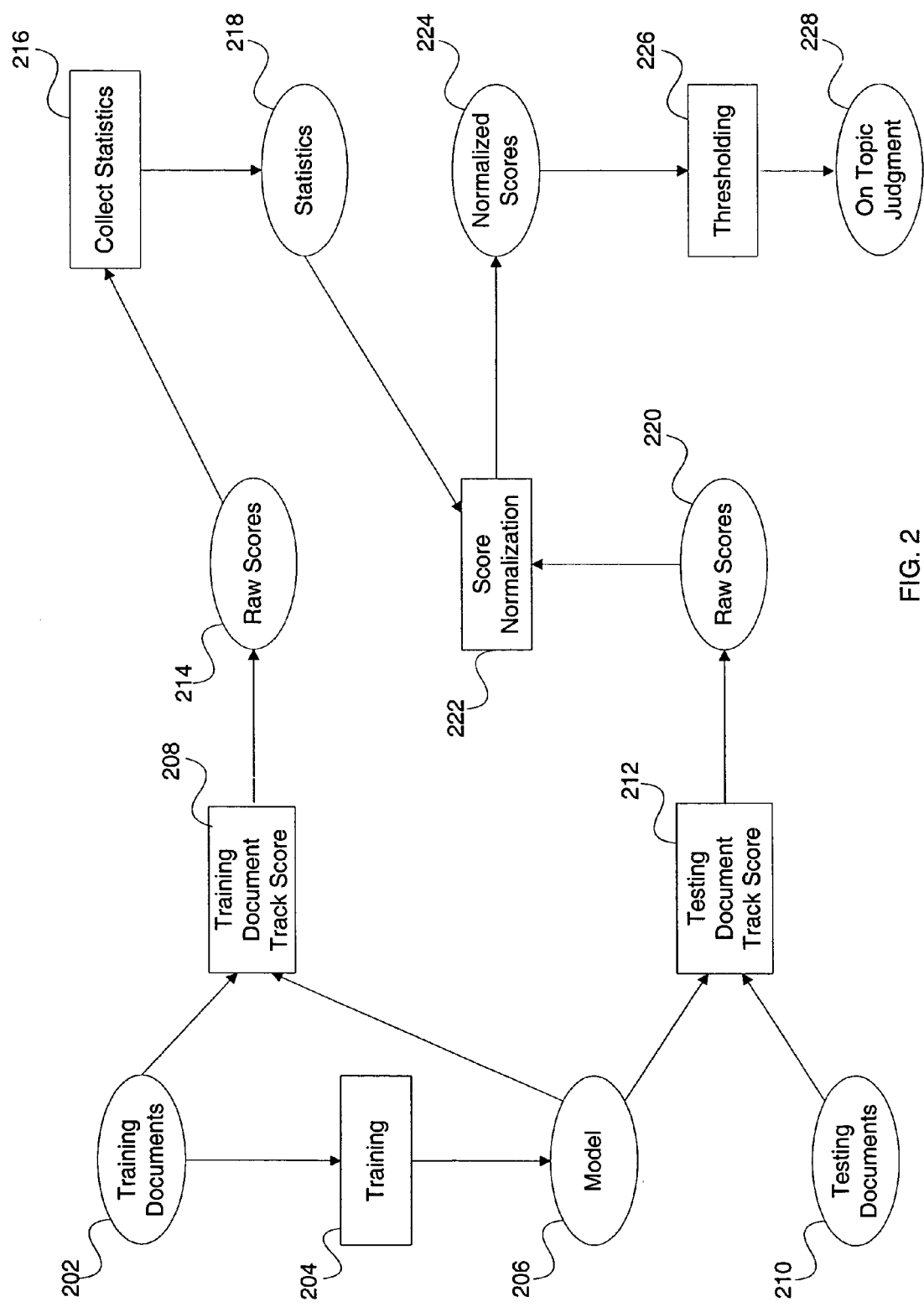
FIG. 2 is an exemplary data flow diagram for an information retrieval system that includes score normalization consistent with the present invention.

FIG. 2 is an exemplary data flow diagram for an information retrieval system that includes score normalization consistent with the present invention. IR system 114 may implement the data flow depicted in FIG. 2, and the various modules discussed are a part of IR system 114. A human annotator decides what topics relate to particular training documents 202. If a particular training document is related to a particular topic, then the annotator designates that document as being "on" that topic. Otherwise, the document is designated as being "off" that topic. Annotation occurs for a number of documents and topics. The training documents are input to a training module 204, which is responsible for examining the frequency of key words in the training documents in order to generate a model 206 for each topic.

A model relates to how frequently different key words appear in the training documents that have been annotated as being on-topic for a particular topic. This frequency is used to characterize the topic. For example, a model for a particular topic may be generated by contrasting the frequency of on-topic key words with a "background" frequency of all words (except for stop words) in all of the training documents. By contrasting these frequencies, more or less significance can be placed on the existence of a key word in a document based on how common it is for that word to be present in all of the documents. In another embodiment, a model is merely a list of key words along with the frequency of those key words for the training documents that have been annotated as being on-topic for a particular topic. A model may also be thought of as a distribution of key words. Models are input to a training document track score module 208 along with the training documents 202, where raw scores 214 are generated representing how close each training document is to each model for the various topics. The models are also input to a testing document track score module 212 along with testing documents 210, where raw scores 220 are generated representing how close each testing document is to the models for the various topics.

Raw scores 214 are input to collect statistics module 216, where various statistics 218 concerning training documents 202 and their raw scores 214 are calculated. These statistics 218 along with raw scores 220 are input to score normalization module 222. Score normalization module 222 normalizes raw scores 220 based on the statistics 218 to create normalized scores 224. Statistics from off-topic training documents are of particular relevance in the normalization. In this manner, scores from one topic will relate to scores from another topic. Normalized scores are subject to thresholding 226. Thresholding 226 compares the normalized scores 224 with a threshold determined by an initial tuning session. Subsequently, an on topic judgment 228 can be made based on a normalized score's relation to the threshold.

A simple example of the data flow depicted in FIG. 2 follows. Suppose that there are 500 training documents, and that 4 of those documents have been labeled as being related to a particular trial. The training documents can be input to training module 204, where a model for the trial is generated using at least the 4 documents related to the trial. This model along with all 500 training documents are input to training document track score module 208, where a raw score 214 is generated for each of the training documents. Of all of the raw scores 214, 496 of the scores relate to off-topic documents, and 4 of the scores relate to on-topic documents. The model is also input to testing document track score module 212 along with a testing document 210, for which a decision as to whether or not the document relates to the trial is desired. As a result a raw score 220 is generated for the testing document 210. For the purposes of this example, assume that the raw score 220 is 8.5.

Training document raw scores 214 are input to the collect statistics module 216, where various statistics 218 on the raw scores are calculated. Subsequently, the statistics 218 and the testing story raw score 220 are input to the score normalization module 222, where a normalized score 224 is generated. For purposes of this example, assume that the normalized score 224 is 6.0. Once this normalized score has been determined, it can be compared to a threshold score that has been previously set. Assuming that the threshold score is 7.0, the comparison indicates that the normalized score of 6.0 does not meet the threshold score of 7.0, and the testing document 210 is designated as being off-topic (e.g., not related to the trial). Without score normalization, a comparison between the testing story raw score 220 and the threshold score would have indicated that testing story 210 is related to the trial.

Figure 3:
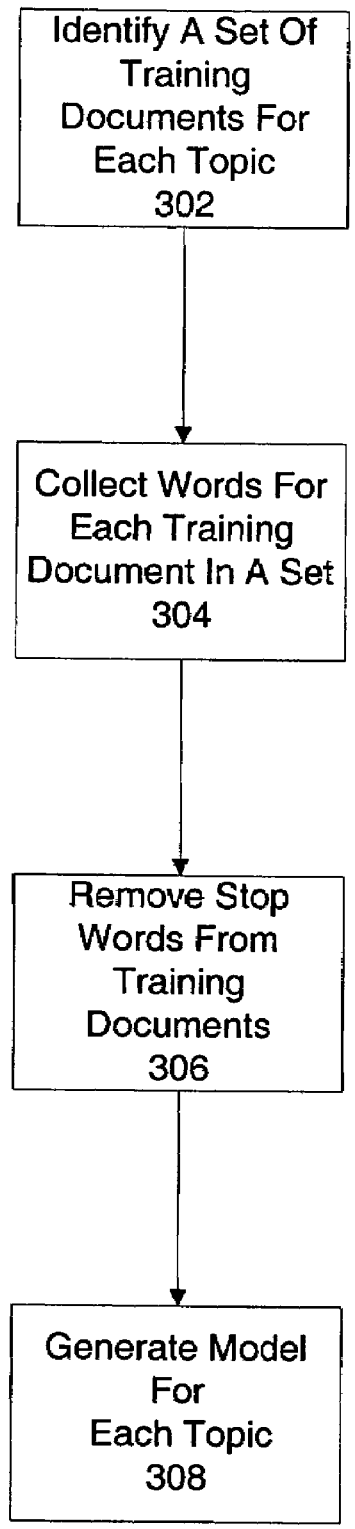
FIG. 3 is an exemplary flowchart of a process for training in a manner consistent with the present invention.

FIG. 3 is an exemplary flowchart of a process for training in a manner consistent with the present invention. Training module 204 identifies a set of training documents 116 or 202 for each of a number of topics (step 302). The training documents in a given set are those documents that have previously been identified as being on-topic by a human annotator. Training module 204 then collects the words from each training document in a set (step 304). This collection may occur for each set that has been identified. Subsequently, the stop words from the training documents in a set are removed (step 306). Stop words refer to common words such as "the", "to", and "a" that appear numerous times in most documents and may affect the score assigned to a document. Once all of the stop words have been removed from the training documents, the training module proceeds to generate a model for each topic (step 308). As mentioned above, a model relates to how frequently different key words appear in the training documents that have been annotated as being on-topic for a particular topic. Model generation is generally well-known and can be found in most topic tracking systems, though the specific manner in which a model is generated may vary greatly.

Figure 4:
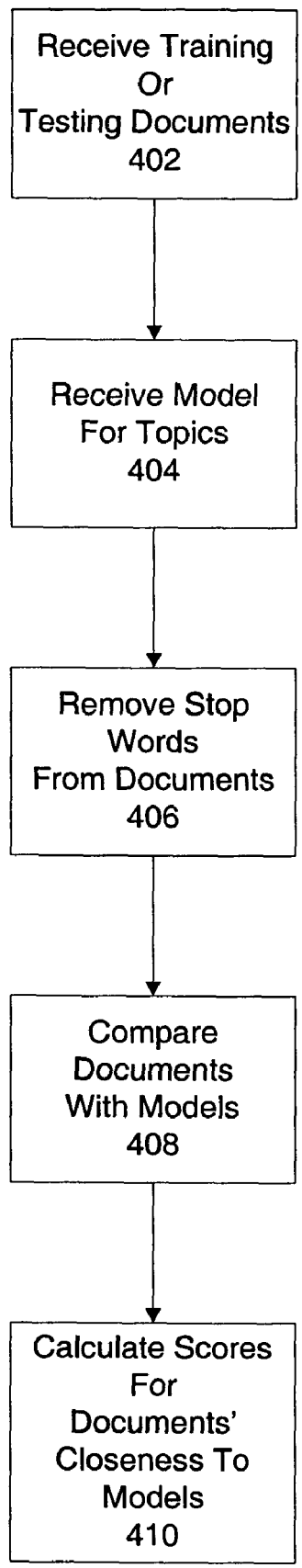
FIG. 4 is an exemplary flowchart of a process for tracking scores of documents in a manner consistent with the present invention.

FIG. 4 is an exemplary flowchart of a process for tracking scores of documents in a manner consistent with the present invention. Both training document track score module 208 and testing document track score module 212 operate in a manner consistent with this flowchart. First, the track score module receives either the training documents 116 or the testing documents 122, depending on whether the scores of the training documents or the testing documents are to be tracked (step 402). The track score module also receives models for a number of topics (step 404). These models were previously generated by the training module 204 described above in connection with FIG. 3. The track score module then removes the stop words from the received documents (step 406). The removal of the stop words from the training or testing documents leaves distributions of key words associated with the documents. These distributions can be compared to the received models, which are also distributions of key words (step 408). Thereafter, raw scores representing how close documents are to particular models are calculated (step 410). Scores may be calculated using well-known methods of calculating scores for the relevance of a document to a topic, such as that used by the popular search engine available from lycos.com. Raw scores may correspond to either training documents or testing documents, depending on which was used as the basis for comparison to the models. It should be understood that although FIG. 4 shows the training or testing documents and the models being received in a sequential manner, it is possible to change the order in which this data is received or to receive them substantially simultaneously.

Figure 5:
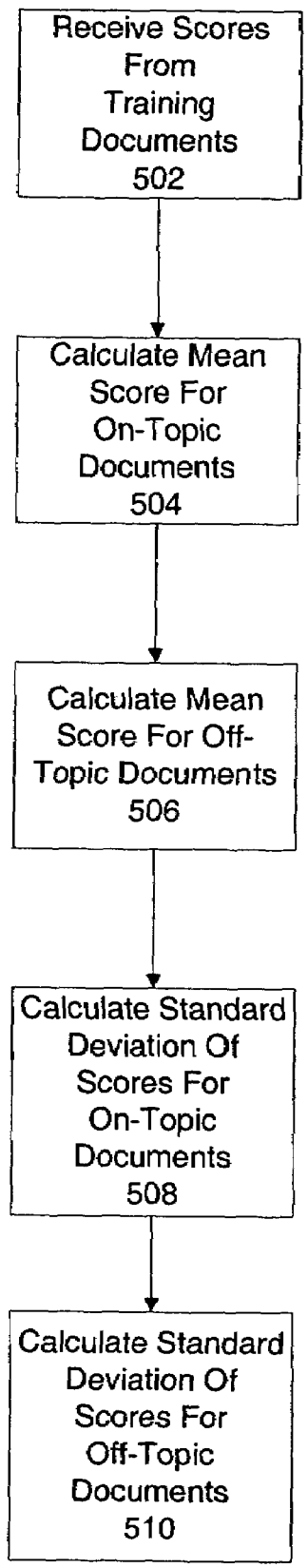
FIG. 5 is an exemplary flowchart of a process for collecting statistics in a manner consistent with the present invention.

FIG. 5 is an exemplary flowchart of a process for collecting statistics in a manner consistent with the present invention. The raw scores 214 calculated for the training documents are received by the collect statistics module 216 (step 502). The collect statistics module 216 uses these scores to calculate several statistics relating to both on-topic documents 120 and off-topic documents 118 for later use. The mean score for all of the training documents 116 that have been designated as on-topic documents 120 for a given topic is calculated (step 504). The mean score for all of the training documents 116 that have been designated as off-topic documents 118 for a given topic is also calculated (step 506). The standard deviation of scores for the on-topic documents 120 with respect to a given topic (step 508) and for the off-topic documents 118 with respect to a given topic (step 510) are also calculated by the collect statistics module 216. Steps 504, 506, 508, and 510, may be repeated for each topic for which a judgment is needed. It should be understood that although FIG. 5 shows the various mean scores and standard deviations being determined in a sequential manner, it is possible to change the order in which these values are determined or to determine them substantially simultaneously.

In an alternative embodiment, the statistics that are calculated in steps 504, 506, 508, and 510 are calculated as robust estimates of mean and standard deviation. For example, in some circumstances, the human annotator that labels the training documents 116 or 202 labels a small number of training documents as being on-topic and a number less than the remaining training documents as being off-topic. This leaves a number of documents that were not actually examined by the annotator but are assumed to be off-topic, because there are typically many more off-topic documents than on-topic documents. IR system 114 goes through one iteration of score normalization using statistics collected from these documents. If there are scores assigned to training documents assumed to be off-topic that are much higher than the threshold score, these documents are discarded, because they might actually be on-topic. Thereafter, IR system 114 goes through another iteration of score normalization using statistics that do not include the discarded documents. The threshold score may be set to a different value after this iteration, as needed, but should not need to be changed again. In this manner, the normalized scores can become more accurate.

Figure 6:
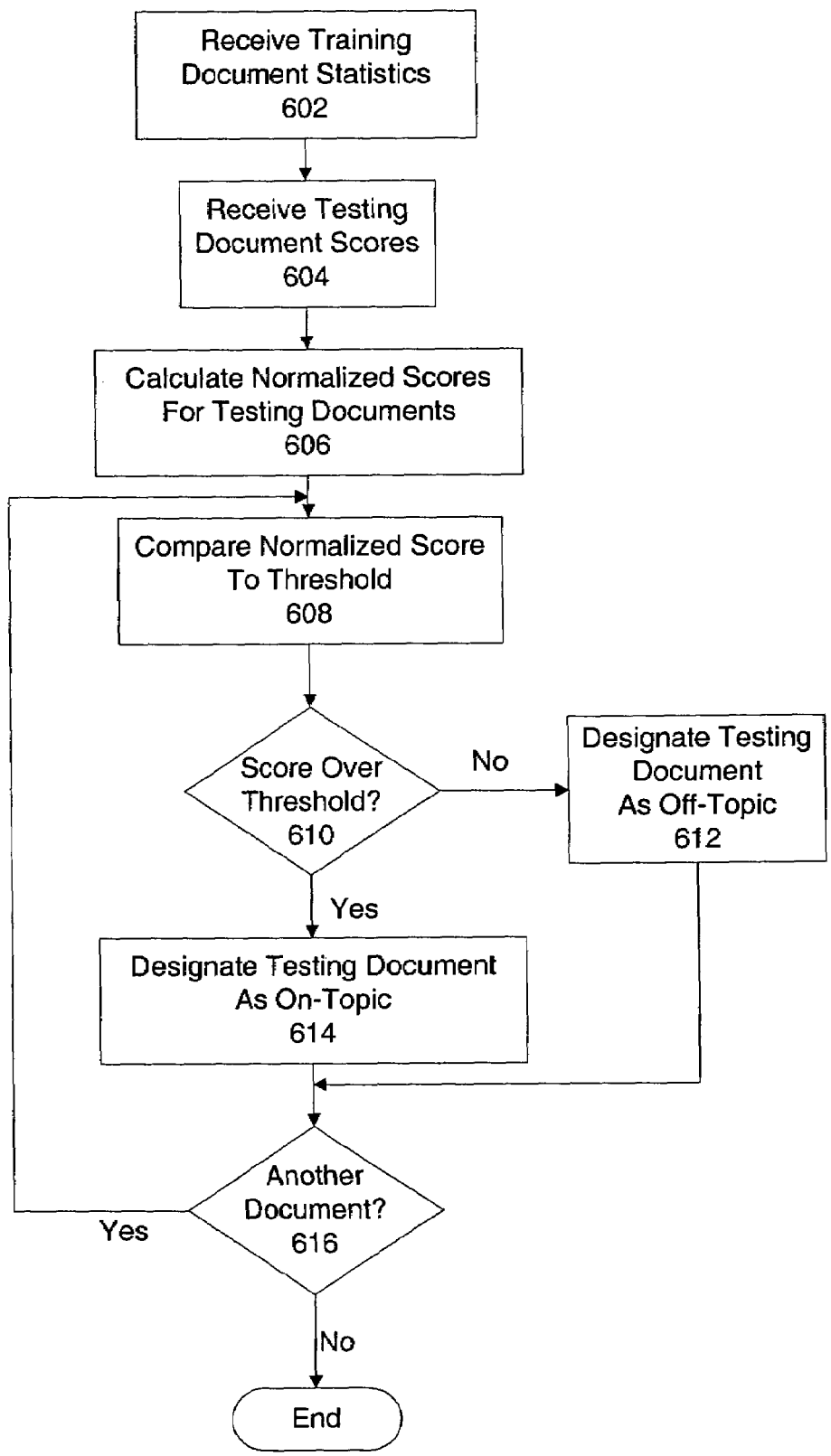
FIG. 6 is an exemplary flowchart of a process for normalizing scores in a manner consistent with the present invention.

FIG. 6 is an exemplary flowchart of a process for normalizing scores in a manner consistent with the present invention. First, the score normalization module 222 receives the training document statistics 218, e.g., mean, standard deviation, (step 602) and the testing document raw scores 220 (step 604). Once these values have been collected, the testing document raw scores 220 are normalized (step 606). Normalized scores may be calculated using the following formula:

$$\text{normalized\_score} = (\text{score} - \mu_{\textit{off\_topic}}) / \sigma_{\textit{off\_topic}}$$

The reference to "score" in this formula represents the testing document raw score for a given topic. The value $\mu_{\textit{off\_topic}}$ represents the mean score of the off-topic documents for the topic. The value $\sigma_{\textit{off\_topic}}$ represents the standard deviation of the scores for the off-topic documents for the topic. Normalized scores may be calculated substantially simultaneously for a set of testing document raw scores, or they may be calculated one at a time, as needed. By normalizing the scores in this manner, scores become more meaningful, because a score from one topic is more likely to relate to the score from another topic.

Notice that the normalized score is based on statistics relating to off-topic document scores. Previous efforts at score normalization tend to focus on on-topic documents. Typically, however, there are many more off-topic documents for a given topic than there are on-topic documents. Another way of thinking about on-topic documents is that they are "not off-topic." By basing the score normalization on statistics relating to off-topic documents, a more accurate decision on whether a testing document is on-topic or off-topic can be made, because there is more statistical data available for what constitutes an off-topic document than is available for what constitutes an on-topic document. Moreover, on-topic documents were used to build the model, so score normalization based on only on-topic documents would inherently be biased. Generally, a low normalized score indicates that the document is not much different from the training documents that were designated as off-topic documents and thus should be designated as off-topic. A high normalized score, however, suggests that the document is more likely to be different from the off-topic training documents and thus should be designated as on-topic. A low or high normalized score, however, does not necessarily guarantee that a testing document will be judged as off-topic or on-topic, respectfully. Other factors weigh in, and the final determination depends on a normalized score's comparison to a threshold.

The threshold is a score threshold between on-topic documents and off-topic documents. Scores above the threshold are considered to be on-topic. Scores below the threshold are considered to be off-topic. The threshold is initially set by a user operating the IR system. This initial tuning is based on a trade off between two types of possible errors. These errors are known as type I errors and type II errors. Type I errors are known as "false alarms" or "false positives," meaning that the testing document was classified as on-topic, when it was actually off-topic. Type II errors are "misses" or "false negatives," meaning that the testing document was classified as off-topic, when it was actually on-topic. Essentially, the user increases and/or decreases the threshold until the number of each type of error is acceptable to the user. With the score normalization of the present invention, the user only needs to fine tune the threshold in this manner for one topic. Further changes to the threshold should not be necessary, because normalized scores are topic independent. A good threshold for one topic is more likely to be good for another topic. This makes it possible to find documents that are all relevant to a set of topics (e.g., multiple query information retrieval applications) or to find documents that are relevant to any of a set of topics.

Whether or not the threshold has been fine tuned yet, a comparison occurs between the normalized score of the current testing document and the threshold (step 608). Note that the threshold is always set at some value, even before tuning is complete. Once the user has tuned the threshold with respect to one topic, further tuning should not be needed. Next a determination is made as to whether or not the normalized score is over the threshold (step 610). If the comparison results in a determination that the normalized score is lower than the threshold, then the testing document is designated as off-topic (step 612). If the comparison results in a determination that the normalized score is higher than the threshold, then the testing document is designated as on-topic (step 614). Once the testing document has been classified as either on-topic or off-topic, a determination is made as to whether more testing documents (step 616) are to be processed for the topic. The process depicted in FIG. 6 may be repeated for a plurality of different topics. Results indicating whether or not particular documents are relevant to a topic may be displayed on video display 110 or on a video display located at a remote computer.

In an alternative embodiment, the following formula can be used for score normalization:

$$\text{normalized\_score} = f_{\textit{on\_topic}} * (\text{score} - \mu_{\textit{off\_topic}}) / \sigma_{\textit{off\_topic}}$$

The value $f_{\textit{on\_topic}}$ represents a scale factor based on the statistics relating to on-topic training documents. For example, in one embodiment $f_{\textit{on\_topic}}$ may be set to equal the following:

$$f_{\textit{on\_topic}} = 25 / (\mu_{\textit{on\_topic}} - 0.5 \sigma_{\textit{on\_topic}})$$

The value $\mu_{\textit{on\_topic}}$ represents the mean score of the on-topic documents for the topic. The value $\sigma_{\textit{on\_topic}}$ represents the standard deviation of the scores for the on-topic documents for the topic. Alternatively, the particular constants (e.g., 25 & 0.5) in the aforementioned formula for the value $f_{\textit{on\_topic}}$ may be altered as desired. Typically, $f_{\textit{on\_topic}}$ is set so that its value is as close to one as possible. The alternative score normalization formula is known as extended score normalization and essentially scales the normalized score by a factor. This extended score normalization depends on statistics from both on-topic and off-topic training documents and requires more on-topic documents among the training documents.

From the foregoing description, it should be apparent that an automatic, efficient, and robust system and method for normalizing scores associated with testing documents has been presented. The score normalization of the present invention is based on statistics relating to off-topic training documents. By basing the score normalization on statistics relating to off-topic training documents, a score from one topic is more likely to relate to the score from another topic, and a more accurate judgment on whether a testing document is on-topic or off-topic can be made. Moreover, a threshold score that is set with respect to one topic is more likely to be good for another topic, eliminating the need to continually adjust the threshold score.

While the present invention has been described in connection with a preferred embodiment, many modifications will be readily apparent to those skilled in the art, and this application is intended to cover any adaptations or variations thereof. One skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. This invention should be limited only by the claims and equivalents thereof.

What is claimed is:

1. A method facilitated by a human annotator and performed in a computer environment for normalizing a score associated with a document, the method comprising the steps of:
    (a) establishing (1) through the computer environment a set of training documents most of which are believed not to be relevant to a topic (off-topic) and (2) through the human annotator a query relevant to the topic (on-topic);
    (b) assigning, through the computer environment, a training document relevance score to each one of the training documents, each training document relevance score representing a measure of relevance of its respective document to the topic;
    (c) determining, through the computer environment, statistics relating to all training document relevance scores and thereby obtaining determined statistics;
    (d) receiving a testing document;
    (e) calculating, through the computer environment, a score of relevance of the testing document to the topic to obtain a testing document relevance score;
    (f) normalizing, through the computer environment and based on the statistics, the testing document relevance score to obtain a normalized score wherein:
        normalizing adjusts the testing document relevance score based on the statistics to be comparable to other scores from which the statistics were determined, and
        the normalized score is a better predictor of probability of the testing document being relevant than the testing document relevant score;
    (g) establishing, through the computer environment, a threshold score representing a relevance threshold for the topic;
    (h) comparing the normalized score to the threshold score to obtain a comparison; and
    (i) designating the testing document as relevant or not relevant to the topic based on the comparison.

2. The method of claim 1, wherein the statistics include a mean score of the training documents not relevant to the topic and a standard deviation of the scores assigned to the set of training documents not relevant to the topic.

3. The method of claim 2, wherein said normalizing step determines the normalized score according the following formula:

$$\text{normalized\_score} = (s - \mu_{off\_topic})/\sigma_{off\_topic}$$

wherein s represents the score assigned to the testing document, $\mu_{off\_topic}$ represents the mean score of the documents not relevant to the topic, and $\sigma_{off\_topic}$ represents the standard deviation of the scores assigned to the set of training documents not relevant to the topic.

4. The method of claim 1, said determining step further comprising:
    determining statistics relating to scores assigned to a set of training documents relevant to the topic.

5. The method of claim 4, wherein the statistics relating to scores assigned to a set of training documents relevant to the topic include a mean score of the documents relevant to the topic and a standard deviation of the scores assigned to the set of training documents relevant to the topic.

6. The method of claim 5, wherein said normalizing step comprises:
    normalizing a score assigned to a testing document based on the statistics relating to the scores assigned to the set of training documents not relevant to the topic and based on the statistics relating to the scores assigned to the set of training documents relevant to the topic.

7. The method of claim 6, wherein said normalizing step determines the normalized score according the following formula:

$$\text{normalized\_score} = f_{on\_topic} * ((s - \mu_{off\_topic})/\sigma_{off\_topic})$$

wherein $f_{on\_topic}$ represents a scale factor based on the statistics relating to the scores assigned to the set of training documents relevant to the topic, s represents the score assigned to the testing document, $\mu_{off\_topic}$ represents the mean score of the documents not relevant to the topic, and $\sigma_{off\_topic}$ represents the standard deviation of the scores assigned to the set of training documents not relevant to the topic.

8. The method of claim 1, wherein said designating step comprises:
    designating the testing document as relevant to the topic based on a determination that the normalized score is greater than the threshold score; and
    designating the testing document as not relevant to the topic based on a determination that the normalized score is not greater than the threshold score.

9. The method of claim 1, further comprising: repeating steps (a)–(d) for a plurality of topics.

10. The method of claim 1, further comprising: repeating steps (a)–(d) for a plurality of testing documents.

11. The method of claim 1, wherein the statistics include a first robust estimate of a mean score of the set of training documents not relevant to the topic and a second robust estimate of a standard deviation of the scores assigned to the set of training documents not relevant to the topic.

12. The method of claim 11 wherein the first robust estimate comprises:
    setting a first robust estimate threshold, based on the determined statistics;
    removing each document of the set of training documents not relevant to the topic which is above the first robust estimate threshold, thereby creating a remaining set of training documents not relevant to the topic; and
    determining new estimates of the statistics that may be more appropriate for off topic documents based solely on the remaining set of training documents.

13. The method of claim 12 wherein the second robust estimate comprises:

setting a second robust estimate threshold, based on the determined statistics; removing each document of the set of training documents not relevant to the topic which is above the second robust estimate threshold, thereby creating a remaining set of training documents not relevant to the topic; and determining new estimates of the statistics that may be more appropriate for offtopic documents based solely on the remaining set of training documents.

14. The method of claim 11 wherein the second robust estimate comprises:

setting a second robust estimate threshold, based on the determined statistics; removing each document of the set of training documents not relevant to the topic which is above the second robust estimate threshold, thereby creating a remaining set of training documents not relevant to the topic; and determining new estimates of the statistics that may be more appropriate for offtopic documents based solely on the remaining set of training documents.

15. A computer-readable storage medium containing instructions for performing a method in a computer environment for normalizing a score associated with a document, the method facilitated by a human annotator comprising:

(a) establishing (1) through the computer environment a set of training documents most of which are believed not to be relevant to a topic (off-topic) and (2) through the human annotator a query relevant to the topic (on-topic);

(b) assigning, through the computer environment, a training document relevance score to each one of the training documents, each training document relevance score representing a measure of relevance of its respective document to the topic;

(c) determining, through the computer environment, statistics relating to all training document relevance scores;

(d) receiving a testing document;

(e) calculating, through the computer environment, a score of relevance of the testing document to the topic to obtain a testing document relevance score;

(f) normalizing, through the computer environment and based on the statistics, the testing document relevance score to obtain a normalized score wherein:

normalizing adjusts the testing document relevance score based on the statistics to be comparable to other scores from which the statistics were determined, and the normalized score is a better predictor of probability of the testing document being relevant than the testing document relevant score;

(g) establishing, through the computer environment, a threshold score representing a relevance threshold for the topic;

(h) comparing the normalized score to the threshold score to obtain a comparison; and (i) designating the testing document as relevant or not relevant to the topic based on the comparison.

16. The computer-readable storage medium of claim 15, wherein the statistics include a mean score of the training documents not relevant to the topic and a standard deviation of the scores assigned to the set of training documents not relevant to the topic.

17. The computer-readable storage medium of claim 16, wherein said normalizing step determines the normalized score according the following formula:

$$\text{normalized\_score} = (s - \mu_{off\_topic})/(\sigma_{off\_topic})$$

wherein s represents the score assigned to the testing document, $\mu_{off\_topic}$ represents the mean score of the documents not relevant to the topic, and $\sigma_{off\_topic}$ represents the standard deviation of the scores assigned to the set of training documents not relevant to the topic.

18. The computer-readable storage medium of claim 15, said determining step further comprising:

determining statistics relating to scores assigned to a set of training documents relevant to the topic.

19. The computer-readable storage medium of claim 18, wherein the statistics relating to scores assigned to a set of training documents relevant to the topic include a mean score of the documents relevant to the topic and a standard deviation of the scores assigned to the set of training documents relevant to the topic.

20. The computer-readable storage medium of claim 19, wherein said normalizing step comprises:

normalizing a score assigned to a testing document based on the statistics relating to the scores assigned to the set of training documents not relevant to the topic and based on the statistics relating to the scores assigned to the set of training documents relevant to the topic.

21. The computer-readable storage medium of claim 20, wherein said normalizing step determines the normalized score according the following formula:

$$\text{normalized\_score} = f_{on\_topic} * ((s - \mu_{off\_topic})/\sigma_{off\_topic})$$

wherein $f_{on\_topic}$ represents a scale factor based on the statistics relating to the scores assigned to the set of training documents relevant to the topic, s represents the score assigned to the testing document, $\mu_{off\_topic}$ represents the mean score of the documents not relevant to the topic, and $\sigma_{off\_topic}$ represents the standard deviation of the scores assigned to the set of training documents not relevant to the topic.

22. The computer-readable storage medium of claim 15, wherein said designating step comprises:

designating the testing document as relevant to the topic based on a determination that the normalized score is greater than the threshold score; and designating the testing document as not relevant to the topic based on a determination that the normalized score is not greater than the threshold score.

23. The computer-readable storage medium of claim 15, further comprising: repeating steps (a)–(d) for a plurality of topics.

24. The computer-readable storage medium of claim 15, further comprising: repeating steps (a)–(d) for a plurality of testing documents.

25. The computer-readable storage medium of claim 15, wherein the statistics include a robust estimate of a mean score of the training documents not relevant to the topic and a robust estimate of a standard deviation of the scores assigned to the set of training documents not relevant to the topic.

26. A method, facilitated by a human annotator and performed in a computer environment for normalizing a score associated with a document, the method comprising the steps of:

(a) receiving (1) through the computer environment a set of training documents not relevant to a topic (off-topic) and (2) through the human annotator a query including the topic (on-topic);

(b) assigning, through the computer environment, a training document relevance score to each one of the training documents, each training document relevance score representing a measure of relevance of its respective document to the topic;

(c) determining, through the computer environment, statistics relating to all training document relevance scores;

(d) receiving a testing document;

(e) calculating, through the computer environment, a score of relevance of the testing document to the topic to obtain a testing document relevance score; and (f) normalizing, through the computer environment and based on the statistics, the testing document relevance score to obtain a normalized score wherein:

normalizing adjusts the testing document relevance score based on the statistics to be comparable to other scores from which the statistics were determined, and the normalized score is a better predictor of probability of the testing document being relevant than the testing document relevant score.

27. The method of claim 26, further comprising:
designating the testing document as relevant or not relevant to the topic based on the normalized score.

28. The method of claim 26, further comprising: comparing the normalized score to a threshold score; and
designating the testing document as relevant or not relevant to the topic based on the comparison.

29. A method facilitated by a human annotator and performed by a processor in a computer environment for searching for documents relevant to a topic comprising the steps of:

establishing through the computer environment a set of training documents not relevant to the topic (off-topic);

the human annotator sending a query including the topic (on-topic) to the processor; and the human annotator receiving results from the processor indicating a document relevant to the topic, wherein the processor:

assigns, through the computer environment, a training document relevance score to each one of the training documents, each training document relevance score representing a measure of relevance of its respective document to the topic;

determines, through the computer environment, statistics relating to all training document relevance scores;

receives a testing document;

calculates, through the computer environment, a score of relevance of the testing document to the topic to obtain a testing document relevance score; normalizes, through the computer environment and based on the statistics, the testing document relevance score to obtain a normalized score wherein:

normalizing adjusts the testing document relevance score based on the statistics to be comparable to other scores from which the statistics were determined, and the normalized score is a better predictor of probability of the testing document being relevant than the testing document relevant score; establishes, through the computer environment, a threshold score representing a relevance threshold for the topic; compares the normalized score to the threshold score to obtain a comparison; and designates the testing document as relevant or not relevant to the topic based on the comparison.

\* \* \* \* \*